United States Patent
Seo et al.

(10) Patent No.: US 8,894,212 B2
(45) Date of Patent: Nov. 25, 2014

(54) PROJECTOR OPTICAL SYSTEM HAVING FIELD LENS CHANGING OPTICAL ANGLE OF ILLUMINATED LIGHT

(75) Inventors: Eunsung Seo, Seoul (KR); Seungman Jeong, Seoul (KR); Hyunho Choi, Seoul (KR); Sanghun Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 466 days.

(21) Appl. No.: 13/044,149

(22) Filed: Mar. 9, 2011

(65) Prior Publication Data

US 2011/0242491 A1   Oct. 6, 2011

(30) Foreign Application Priority Data

Apr. 2, 2010   (KR) .......................... 10-2010-0030472

(51) Int. Cl.
*G03B 21/20* (2006.01)
*H04N 9/31* (2006.01)

(52) U.S. Cl.
CPC ............ *G03B 21/208* (2013.01); *H04N 9/3152* (2013.01); *H04N 9/317* (2013.01)
USPC ................. 353/31; 353/94; 353/102; 359/649

(58) Field of Classification Search
CPC .... G03B 21/00; G03B 21/14; G03B 21/2073; G03B 21/20; G03B 21/208; H04N 9/3108; H04N 9/3152; H04N 9/317; H04N 9/3197; G02B 13/0095; G02B 13/16; G02B 13/18
USPC ............. 353/20, 30–31, 33, 81, 94, 122, 102; 359/649–651, 800
See application file for complete search history.

(56) References Cited

U.S. PATENT DOCUMENTS

| | | | | |
|---|---|---|---|---|
| 6,118,588 A * | 9/2000 | Yamamoto | ..................... | 359/618 |
| 6,155,688 A * | 12/2000 | Anderson et al. | ................ | 353/99 |
| 6,607,280 B2 * | 8/2003 | Koyama et al. | ................ | 362/601 |
| 6,805,450 B2 * | 10/2004 | Nishida et al. | ................... | 353/98 |
| 6,851,811 B2 * | 2/2005 | Akiyama | ......................... | 353/31 |
| 7,029,130 B2 * | 4/2006 | Cannon et al. | ................... | 353/97 |
| 7,145,728 B2 * | 12/2006 | Cha | ................................ | 359/637 |
| 2005/0157268 A1 * | 7/2005 | Akiyama | ......................... | 353/38 |

(Continued)

FOREIGN PATENT DOCUMENTS

KR   10-2007-0083203 A   8/2007

OTHER PUBLICATIONS

Office Action dated Jun. 28, 2011 in Korean Application No. 10-2010-0030472, filed Apr. 2, 2010.

*Primary Examiner* — Tony Ko
*Assistant Examiner* — Jori S Reilly-Diakun
(74) *Attorney, Agent, or Firm* — Saliwanchik, Lloyd & Eisenschenk

(57) ABSTRACT

A projector optical system is provided, the system including an illumination unit including illumination lenses illuminating light downwards, a display device receiving light illuminated from the illumination lenses to enable to realize an image, projection lenses downwardly projecting light emitted from the display device to a screen, and a field lens changing an optical angle of the light illuminated from the illumination lenses and emitting the light to the display device, and changing an optical angle by receiving an image light of the display device and emitting the light to the projection lenses.

19 Claims, 12 Drawing Sheets

(56) References Cited

U.S. PATENT DOCUMENTS

| | | | |
|---|---|---|---|
| 2006/0126032 A1* | 6/2006 | Takaura et al. | 353/99 |
| 2007/0097337 A1* | 5/2007 | Morikuni et al. | 353/99 |
| 2009/0190101 A1* | 7/2009 | Alasaarela et al. | 353/81 |
| 2010/0033685 A1* | 2/2010 | Seo et al. | 353/31 |
| 2010/0091249 A1* | 4/2010 | Benedix et al. | 353/31 |
| 2011/0090464 A1* | 4/2011 | Jhang et al. | 353/31 |
| 2011/0194076 A1* | 8/2011 | Seo et al. | 353/20 |
| 2012/0044586 A1* | 2/2012 | Kang et al. | 359/718 |

* cited by examiner

PROJECTOR OPTICAL SYSTEM HAVING FIELD LENS CHANGING OPTICAL ANGLE OF ILLUMINATED LIGHT

CROSS-REFERENCE TO RELATED APPLICATION

This application claims the benefit under 35 U.S.C. §119 of Korean Patent Application No. 10-2010-0030472, filed Apr. 2, 2010, which is hereby incorporated by reference in its entirety.

BACKGROUND OF THE DISCLOSURE

1. Field of the Invention

Embodiments of the present disclosure may relate to a projector optical system configured to reduce thickness of a projector.

2. Description of Related Art

Lately, a projector, which magnifies and projects a small image to a large screen, attracts attention as a flat display enabling to realize a large-sized screen with a slim design instead of a cathode ray tube having a large volume and a limited screen size.

A device enabling to realize a high quality image on a large screen may include a liquid crystal display (hereinafter abbreviated LCD), a plasma display panel and a projection display system, to name a few.

Generally, an optical system of a project may be categorized into two types, that is, an illumination system, and a projection system. The illumination system is configured such that light emitted from a light source is equally illuminated to a small-sized imager via an FEL (Fly Eye Lens) or an integrator which is an optical tunnel, and the projection system is configured such that an illuminated light is incident on each panel via the illumination system, where an imager is enlarged to be captured on a screen.

BRIEF SUMMARY

The present disclosure is directed to solving an subject of reducing a thickness of a projector.

Technical subjects to be solved by the present disclosure are not restricted to the above-mentioned description, and any other technical problems not mentioned so far will be clearly appreciated from the following description by those skilled in the art.

In one general aspect of the present disclosure, there is provided a projector optical system, the system comprising: an illumination unit including illumination lenses illuminating light downwards; a display device receiving light illuminated from the illumination lenses to enable to realize an image; projection lenses downwardly projecting light emitted from the display device to a screen; and a field lens changing an optical angle of the light illuminated from the illumination lenses and emitting the light to the display device, and changing an optical angle by receiving an image light of the display device and emitting the light to the projection lenses.

In some exemplary embodiments of the present disclosure, an optical axes of the illumination lenses may accord with those of projection lenses.

In some exemplary embodiments of the present disclosure, a center of the display device may be positioned further down than the optical axes of the projection lenses.

In some exemplary embodiments of the present disclosure, a center of the display device may be positioned further down than the optical axis of the illumination lenses.

In some exemplary embodiments of the present disclosure, the optical axes of the illumination lenses may be different from those of projection lenses.

In some exemplary embodiments of the present disclosure, the optical axes of the illumination lenses may cross those of projection lenses.

In some exemplary embodiments of the present disclosure, the display device may be a DMD (Digital Micromirror Device).

In some exemplary embodiments of the present disclosure, the display device may be a reflective display device or a transmissive display device.

In some exemplary embodiments of the present disclosure, at least any one lens of the illumination lenses may have an optical axis further down than that of the field lens.

In some exemplary embodiments of the present disclosure, the illumination unit may further include a collimation lens that advances in parallel light emitted from a light source to a predetermined direction, and an optical component that uniformly emits the light from the collimation lens to the display device, wherein at least any one lens of the illumination unit may be tilted from an optical axis of the light source, the collimation lens and the optical component.

In some exemplary embodiments of the present disclosure, a center of the light source may be downwardly positioned from the optical axis of the collimation lens.

In some exemplary embodiments of the present disclosure, the optical axis of the light source and the collimation lens is identical to that of the optical component.

In some exemplary embodiments of the present disclosure, the projection optical system may further include a PBS (Polarizing Beam Splitter) that transmits the light from the illumination unit to the display device, the illumination lenses may include first and second illumination lenses, where the first illumination lens is interposed between the optical component and the PBS, and the second illumination lens is interposed between the PBS and the display device.

In some exemplary embodiments of the present disclosure, the illumination unit may further include a collimation lens advancing in parallel the light emitted from the light source to a predetermined direction, an FEL (Fly Eye Lens) uniformly emitting the light from the collimation lenses to the display device, and a prism upwardly eccentrically emitting the light through the FEL to illuminate the display device.

In some exemplary embodiments of the present disclosure, the prism may be one of a structure of refracting the incident light and the emitted light to upwardly illuminate the display device, a structure of refracting the emitted light to upwardly illuminate the display device, and a structure of refracting the incident light to upwardly illuminate the display device.

In some exemplary embodiments of the present disclosure, the prism may be formed with two sides not perpendicular to the optical axis of the illuminating unit.

In some exemplary embodiments of the present disclosure, the illumination unit may include an optical guide block receiving the light emitted from the light source to generate an optical shape that is same as that the display device, and illumination lenses formed with an optical axes deviated from those of optical guide block.

In some exemplary embodiments of the present disclosure, first and second condenser lenses condensing the light emitted from the light source to the optical guide block may be further interposed between the light source and the optical guide block.

In another general aspect of the present disclosure, there is provided a projector optical system, the system comprising: an illumination unit including illumination lenses illuminating light downwards; a TIR (Total Information Reflector) reflecting light from the illumination unit and transmitting an image light; a display device receiving the light from the illumination unit reflected from the TIR to enable to realize the image light; projection lenses downwardly projecting light emitted from the display device to a screen; and field lenses changing an optical angle of the light illuminated from the illumination lenses and emitting the light to the display device, and changing an optical angle by receiving an image light of the display device and emitting the light to the projection lenses.

In some exemplary embodiments of the present disclosure, the field lenses may be positioned between the TIR and the display device.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

The projector optical system according to the present disclosure has an advantageous effect in that field lenses are interposed between illumination lenses and a display device, and between projection lenses and the display device to reduce thickness of illumination lenses and thickness of projection lenses, whereby a thickness of a projector can be reduced to make the projector thin and light.

BRIEF DESCRIPTION OF THE DRAWINGS

Accompanying drawings are included to provide a further understanding of arrangements and embodiments of the present disclosure and are incorporated in and constitute a part of this application. In the following drawings, like reference numerals refer to like elements and wherein.

Figure 1:
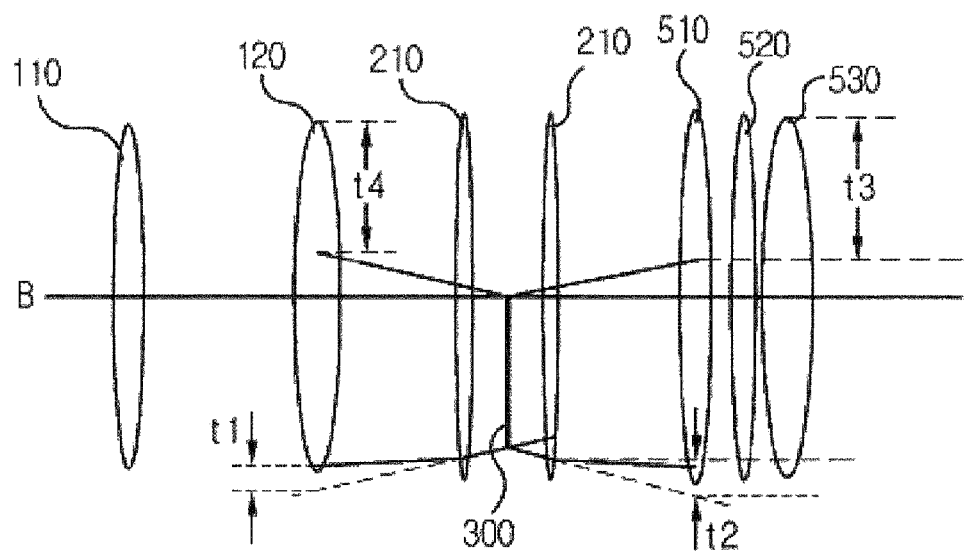
FIG. 1 is a schematic view of a projector optical system according to a first exemplary embodiment of the present disclosure.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

DETAILED DESCRIPTION

Hereinafter, exemplary embodiments of the present disclosure are described in detail with reference to the accompanying drawings. In the drawings, sizes or shapes of constituent elements may be exaggerated for clarity and convenience.

Particular terms may be defined to describe the disclosure in the best mode as known by the inventors. Accordingly, the meaning of specific terms or words used in the specification and the claims should not be limited to the literal or commonly employed sense, but should be construed in accordance with the spirit and scope of the disclosure. The definitions of these terms therefore may be determined based on the contents throughout the specification. Acronyms are used extensively throughout the description to avoid excessively long descriptive phrases. The meaning will be clear from the context of the description.

A projector optical system according to the present disclosure employs a field lens changing an optical angle of incident light and emitting the light to the display device, to an optical system including illumination lenses illuminating light downwards to a display device, and projection lenses downwardly projecting an image light emitted of the display device to a screen, whereby thickness of a projector can be reduced. At this time, the projector optical system may be designed with an optical axis of the illumination lens identical to that of projection lens, or with the optical axis of the illumination lens different from that of projection lens.

FIG. 1 is a schematic view of a projector optical system according to a first exemplary embodiment of the present disclosure.

A projector optical system according to a first exemplary embodiment of the present disclosure may comprise: illumination lenses (110, 120) illuminating light downwards; a display device (300) receiving light illuminated from the illumination lenses (110, 120) to enable to realize an image; projection lenses (510, 520, 530) downwardly projecting light emitted from the display device (300) to a screen; and a field lens (210) changing an optical angle of the light illuminated from the illumination lenses (110, 120) and emitting the light to the display device (300), and changing the optical angle by receiving an image light of the display device (300) and emitting the light to the projection lenses (510, 520, 530).

Figure 2:
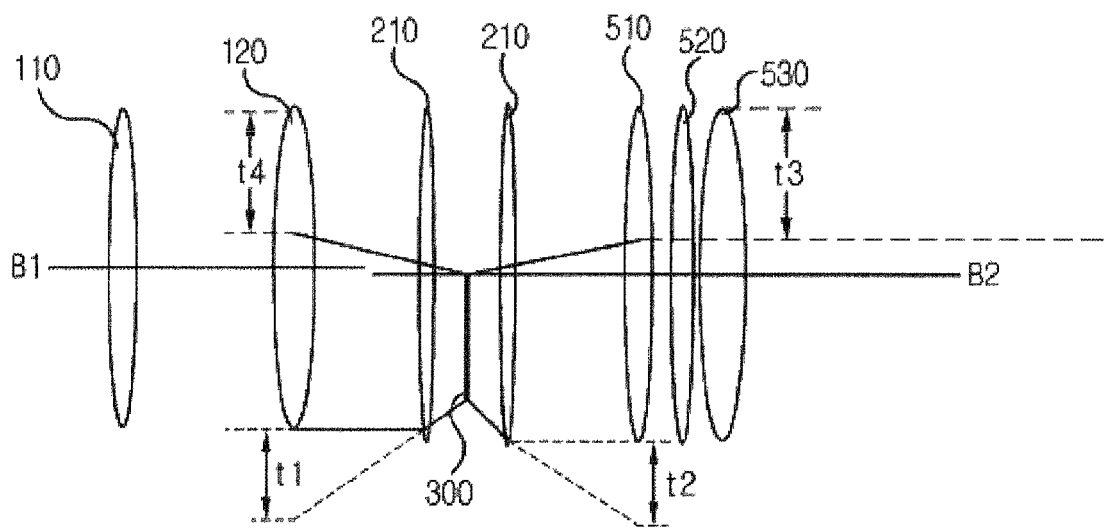
FIG. 2 is a schematic view of a projector optical system according to a second exemplary embodiment of the present disclosure.
Figure 3:
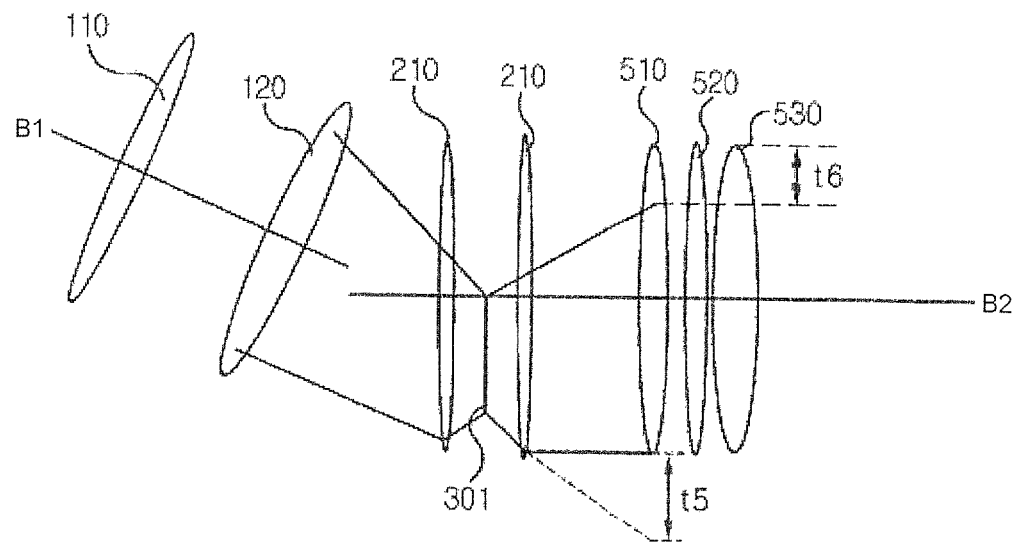
FIG. 3 is a schematic view of a projector optical system according to a third exemplary embodiment of the present disclosure.
Figure 6:
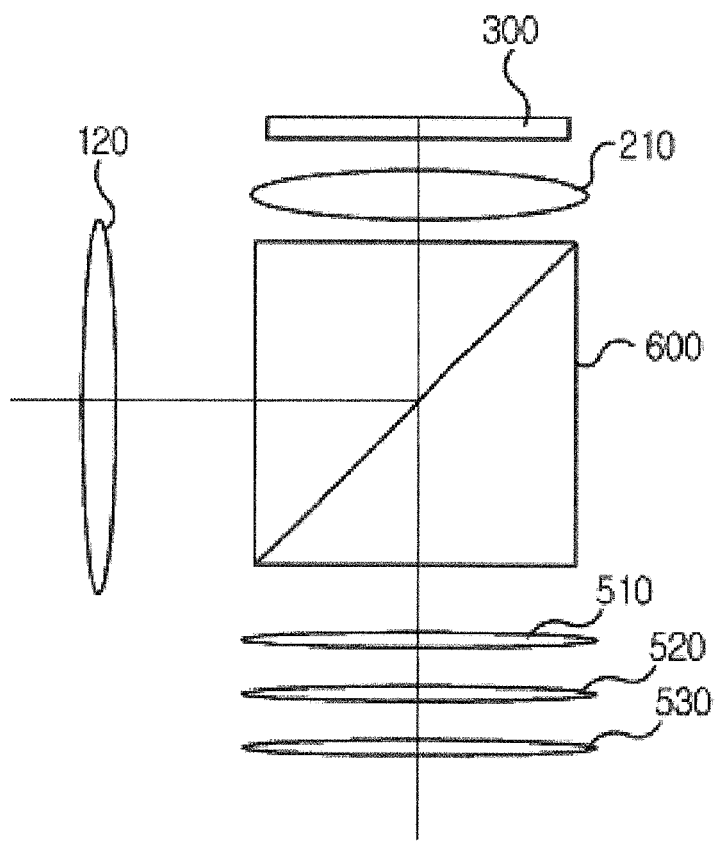
FIG. 6 is a schematic view illustrating a PBS (Polarizing Beam Splitter) in a projector optical system according to the present disclosure.

Although the field lens (210) is referred to as having reference numeral of '210' around the display device (300) in FIGS. 1, 2 and 3, and in view of a projector optical system in FIG. 6 that is applied with a PBS (Polarizing Beam Splitter. 600) reflecting light illuminated from the illumination lenses (110, 120) and transmitting an image light of the display device (300), the field lens comprises not two field lenses, but one field lens (210) that is commonly used for both projection unit and illumination unit.

The projector optical system according to the present disclosure is advantageously configured in such a manner that the field lens (210) is interposed between the illumination lenses (110, 120) and the display device (300), and between the projection lenses (510, 520, 530) and the display device (300) to reduce the thickness of each of the illumination lenses (110, 120) and each of the projection lenses (510, 520, 530), whereby the thickness of a projector can be reduced to make the projector compact, miniaturized and light.

To be more specific, the field lens (210) changes an angle of light emitted from the illumination lenses (110, 120) and transmits to the display device (300), and changes an angle of an image light of the display device (300) and transmits to the projection lenses (510, 520, 530), whereby the thickness of the illumination lenses (110, 120) and the projection lenses (510, 520, 530) can be reduced.

That is, as shown in FIG. 1, the light emitted from the illumination lenses (110, 120) is refracted by the field lens (210) to dispense with predetermined thicknesses (t4, t1) at an upper end and a bottom end of the illumination lenses (110, 120), and the image light of the display device (300) is refracted by the field lens (210) to dispense with predetermined thicknesses at an upper end and a bottom end of the projection lenses (510, 520, 530).

Therefore, the illumination lenses (110, 120) and the projection lenses (510, 520, 530) in the projection optical system according to the first exemplary embodiment of the present disclosure can greatly reduce thicknesses of illumination lenses and projection lenses over those of a projector optical system that is not formed with the field lens (210).

Furthermore, the projector optical system according to the first exemplary embodiment of the present disclosure is an optical system that has an optical axis (B) co-used by the illumination lenses (110, 120) and the projection lenses (510, 520, 530).

Still furthermore, the projector optical system according to the first exemplary embodiment of the present disclosure is intended for upward illumination and downward illumination, such that the display device (300) is positioned downward of the optical axis (B) of the projection lenses (510, 520, 530).

The display device (300) may be applied with a reflection type display device or a projection type display device such as LCOS (Liquid Crystal On Silicon) or a DMD (Digital Mirror Device).

Meanwhile, the field lens that is used for the projector optical system according to the present disclosure cannot be used in a projector optical system that uses the conventional downward projection lens.

That is, an optical axis of a projection lens cannot be matched to a center of the display device through downward projection in a projector optical system using a downward projection lens, and if a field lens is used, the center of the display device and that of the projection lens can be matched to disable the projector optical system to perform the downward projection.

As a result, the projector optical system according to the present disclosure is disposed with a field lens, and is realized by an optical system capable of downward projection and downward illumination, such that the projector optical system according to the present disclosure has an advanced advantageous effect capable of thinning and lightening the projector over that of a conventional projector.

FIG. 2 is a schematic view of a projector optical system according to a second exemplary embodiment of the present disclosure.

The projector optical system according to the second exemplary embodiment of the present disclosure is same as that of the first exemplary embodiment of the present disclosure {the optical axis (B1) of the illumination lenses (110, 120) is different from the optical axis (B2) of the projection lenses (510, 520, 530)}, such that the field lens (210) is interposed between the illumination lenses (110, 120) and the display device (300), and between the projection lenses (510, 520, 530) and the display device (300) to reduce the thickness of each of the illumination lenses (110, 120) and each of the projection lenses (510, 520, 530).

That is, the projector optical system according to the second exemplary embodiment of the present disclosure may comprise: illumination lenses (110, 120) illuminating light downwards; a display device (300) receiving light illuminated from the illumination lenses (110, 120) to enable to realize an image; projection lenses (510, 520, 530) downwardly projecting light emitted from the display device (300) to a screen; and a field lens (210) changing an optical angle of the light illuminated from the illumination lenses (110, 120) and emitting the light to the display device (300), and changing the optical angle by receiving an image light of the display device (300) and emitting the light to the projection lenses (510, 520, 530), where the optical axis (B1) of the illumination lenses (110, 120) is different from the optical axis (B2) of the projection lenses (510, 520, 530).

At this time, at least one of the illumination lenses (110, 120) may have an optical axis aligned more downwardly than that of the field lens (210).

As illustrated in FIG. 2, the projector optical system according to the second exemplary embodiment of the present disclosure is such that the light emitted from the illumination lenses (110, 120) is refracted by the field lens (210) and the image light of the display device (300) is refracted by the field lens (210) to dispense with predetermined thicknesses (t4, t1) at an upper end and a bottom end of the illumination lenses (110, 120), and dispense with predetermined thicknesses (t3, t2) at an upper end and a bottom end of the projection lenses (510, 520, 530), such that thicknesses of illumination lenses and projection lenses can be reduced.

FIG. 3 is a schematic view of a projector optical system according to a third exemplary embodiment of the present disclosure.

The projector optical system according to the third exemplary embodiment of the present disclosure is such that an optical axis (B1) of the illumination lenses (110, 120) and that (B2) of the projection lenses (510, 520, 530) is different, and the optical axis (B1) of the illumination lenses (110, 120) and that (B2) of the projection lenses (510, 520, 530) are crossed at a predetermined point.

The display device (300) of the projector optical system according to the third exemplary embodiment of the present disclosure is therefore applied with a DMD (Digital Mirror Device).

Therefore, the projector optical system according to the third exemplary embodiment of the present disclosure may comprise: illumination lenses (110, 120) illuminating light downward; a DMD (Digital Mirror Device. 301) receiving the light illuminated by the illumination lenses (110, 120) to implement an image; projection lenses (510, 520, 530) downwardly projecting the light emitted from the DMD (301) to a display device; and a field lens (210) changing an angle of light emitted from the illumination lenses (110, 120) and transmits to the DMD (301), and changes an angle of an image light of the DMD (301) by receiving the image light of the DMD (310) and transmits to the projection lenses (510, 520, 530), where an optical axis (B1) of the illumination lenses (110, 120) and that (B2) of the projection lenses (510, 520, 530) are crossed.

Therefore, the projector optical system according to the third exemplary embodiment of the present disclosure is such that the image light of the DMD (301) is refracted by the field lens (210) to be transmitted to the projection lenses (510, 520, 530), whereby predetermined thicknesses (t6, t5) at an upper end and a bottom end of the projection lenses (510, 520, 530) can be removed to thereby reduce the thickness of the projector optical system.

Figure 4:
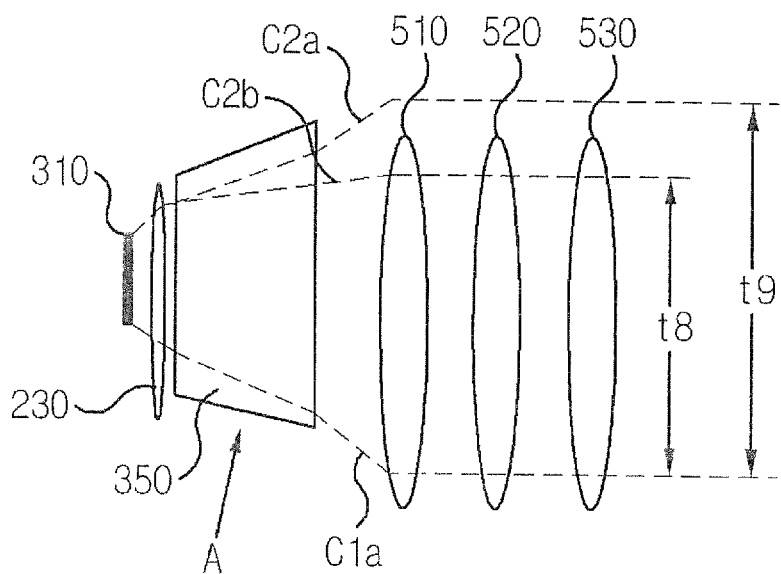
FIG. 4 is a schematic view of a projector optical system according to a fourth exemplary embodiment of the present disclosure.
Figure 5:
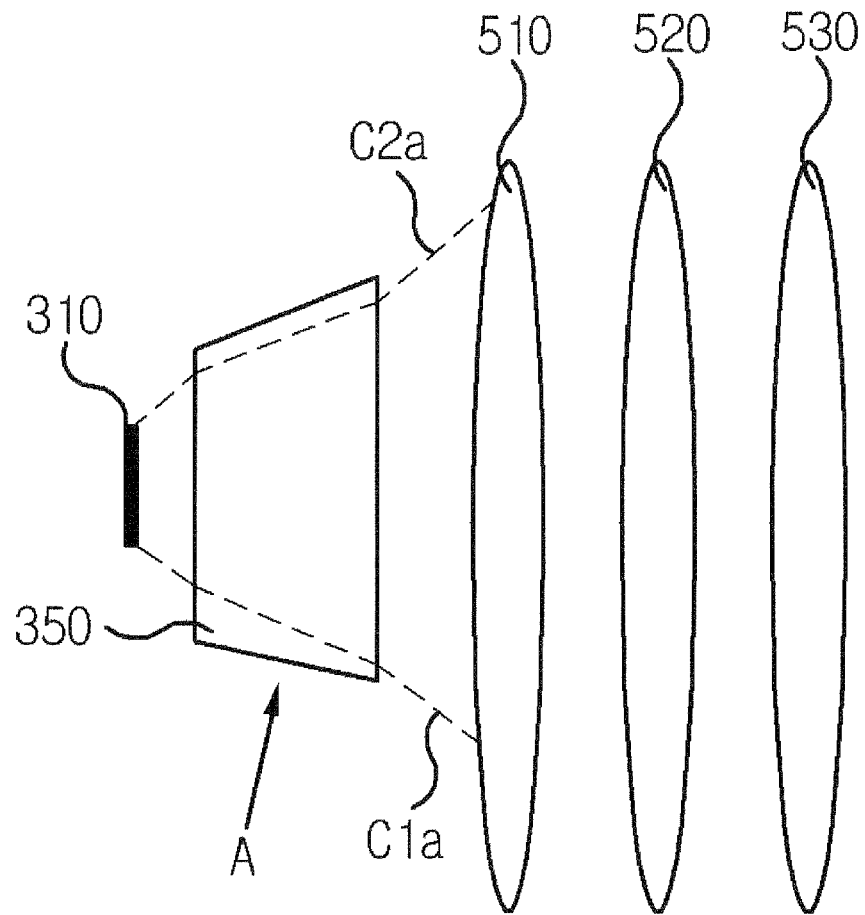
FIG. 5 is a schematic view of a comparative example of FIG. 4.

FIG. 4 is a schematic view of a projector optical system according to a fourth exemplary embodiment of the present disclosure, and FIG. 5 is a schematic conceptual view of a comparative example of FIG. 4.

The projector optical system according to the fourth exemplary embodiment of the present disclosure may comprise: a TIR (Total Information Reflector. 350) reflecting light (A) of an illumination unit and transmitting an image light; a display device (310) receiving the light of the illumination unit reflected by the TIR (350) to realize the image light; a field lens (230) receiving the image light of the display device (310), changing an angle of the light and emitting the light; and projection lenses (510, 520, 530) downwardly projecting the light emitted from the field lens (230) to the display device (310).

The projector optical system according to the fourth exemplary embodiment of the present disclosure is such that light (A) of the illumination unit entered the TIR (350) is reflected from the TIR (350) to the display device (300) to realize image light, and an angle of the image light of the display device (310) is changed by the field lens (230) to be incident on the projection lenses (510, 520, 530) and to be downwardly projected to a screen.

At this time, as shown in FIG. 5, the image light of the display device (310) is not changed to pass through the TIR (350) and to be incident on the projection lenses (510, 520, 530) in a projector optical system in which the field lens (230) is absent. Therefore, thicknesses of the projection lenses (510, 520, 530) are determined by the image light of the display device (310) whose angle is not changed. At this point, a high ray 'C2a' and a low 'C1a' of the image light that has passed the TIR (350) are not changed in angles thereof.

Meanwhile, in FIG. 4 in which a projector optical system according to the fourth exemplary embodiment of the present disclosure, the field lens (230) is present between the display device (310) and the TIR (350) to change the angle of the high ray 'C2a' of the image light that has passed the TIR (350) to 'C2b'. Therefore, in a projector optical system having no field lens (230), each thickness of the projection lenses (510, 520, 530) is 't9' due to the high ray 'C2a' of the image light of the display device (310) in which the angle is not changed, whereas, in the projector optical system having the field lens (230) according to the fourth exemplary embodiment of the present disclosure, each thickness of the projection lenses (510, 520, 530) is 't8' which is thinner than 't9' due to the high ray 'C2b' of the image light of the display device (310) in which the angle is changed (t9>t8).

That is, each thickness of projection lenses can be also reduced by mounting a field lens in the fourth exemplary embodiment of the present disclosure.

Figure 7:
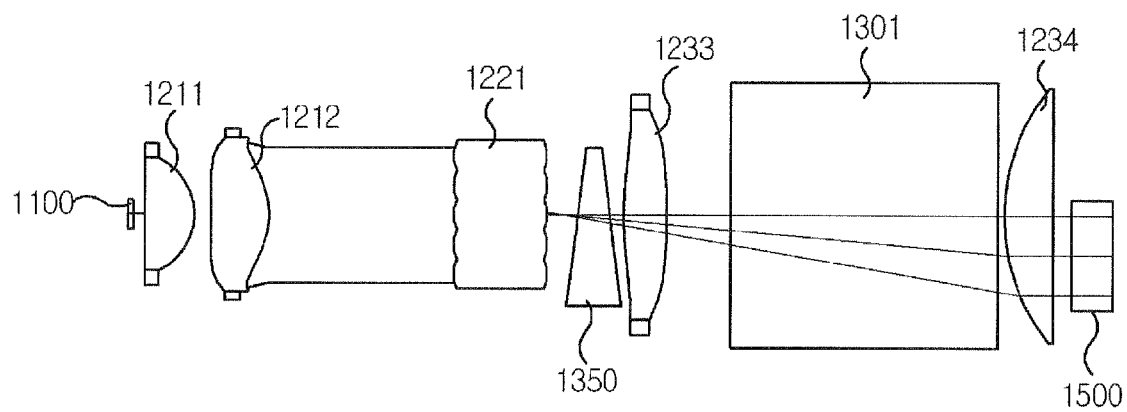
FIG. 7 is a schematic view illustrating configuration of an illumination unit for downward illumination in a projector optical system according to a first exemplary embodiment of the present disclosure.

FIG. 7 is a schematic view illustrating configuration of an illumination unit for downward illumination in a projector optical system according to a first exemplary embodiment of the present disclosure.

There are many downward illumination methods in the projector optical system according to a first exemplary embodiment of the present disclosure. The following examples will explain configurations of projector optical systems for downward illumination.

First, the illumination unit in the projector optical system according to the first exemplary embodiment of the present disclosure is to construct an optical system for downwardly illuminating light to a display device (1500), using a prism (1350).

Therefore, the illumination unit in the projector optical system according to the first exemplary embodiment of the present disclosure may further include a light source (1100), collimation lenses (1211, 1212) advancing light emitted from the light source (1100) to a predetermined direction in parallel, an FEL (Fly Eye Lens, 1221) causing the light of the collimation lenses (1211, 1212) to be uniformly incident on a display device (1500), and a prism (1350) downwardly polarizing the light from the FEL (1221) and illuminating the light to the display device (1500), where the FEL (1221) may be replaced by an optical component that performs the identical function as that of FEL (1221).

That is, the illumination unit is formed with the prism (1350) to downwardly polarizing the light emitted from the light source (1100) and to allow the light to be incident on the display device (1500).

Figure 8A:
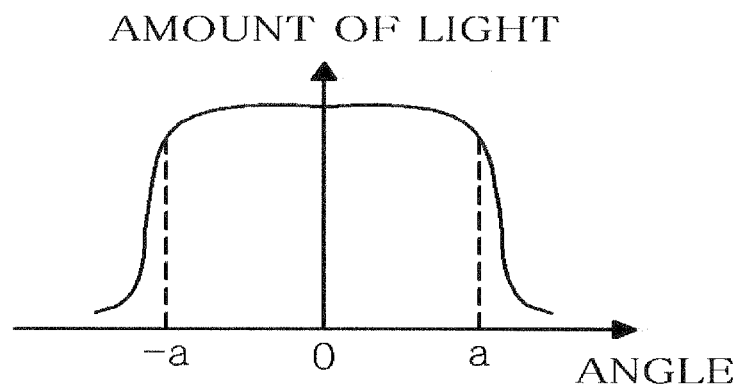
FIGS. 8a and 8b are optical angle distribution views before and after light transmits a prism of FIG. 7.
Figure 8B:
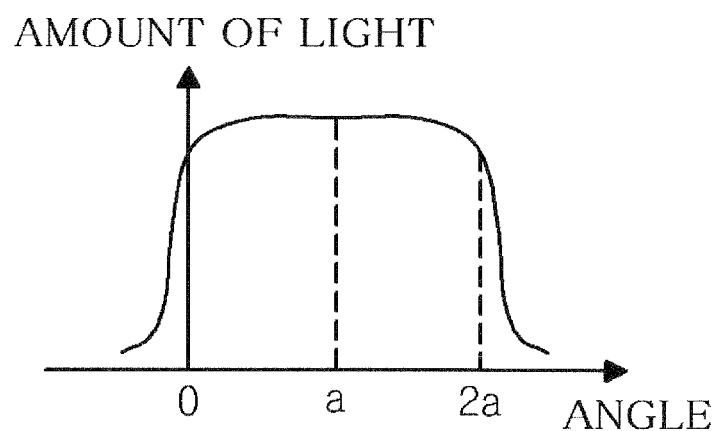

To be more specific, as shown in FIG. 8a, the light through the FEL (1221) is horizontally and vertically symmetrized and distributed with an optical angle symmetrized based on the optical axis. Furthermore, as shown in FIG. 8b, the light through the prism (1350) is distributed with an optical angle downwardly moved based on an optical axis due to eccentricity effects of the prism (1350). The angle of the moving light is determined by an angle of a prism, and the angle of the prism is determined by degree of downward illumination. Furthermore, illumination lenses (1233, 1234) may be interposed between the prism (1350) and a PBS (1301), and between the PBS (1301) and the display device (1500).

Figure 9A:
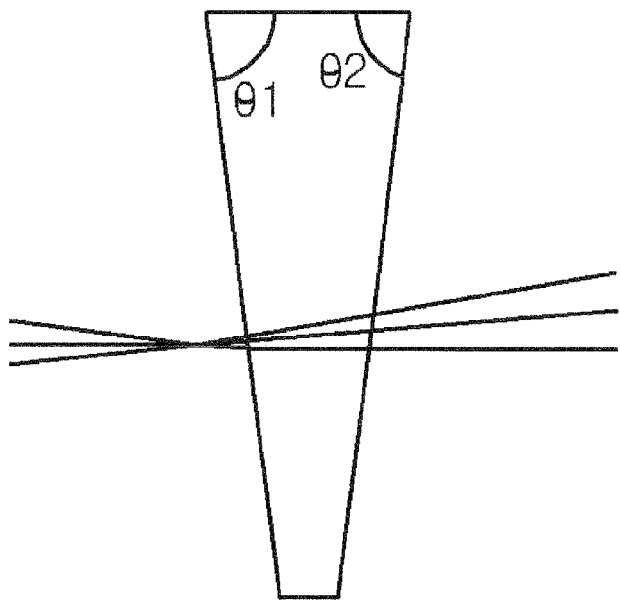
FIGS. 9a, 9b and 9c are schematic views illustrating configuration of a prism in a projector optical system according to the present disclosure.
Figure 9B:
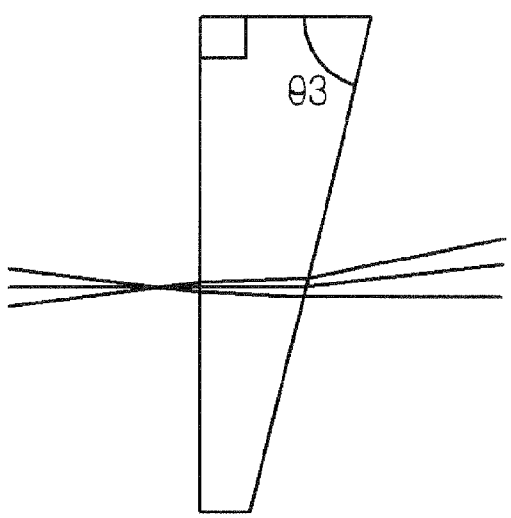
Figure 9C:
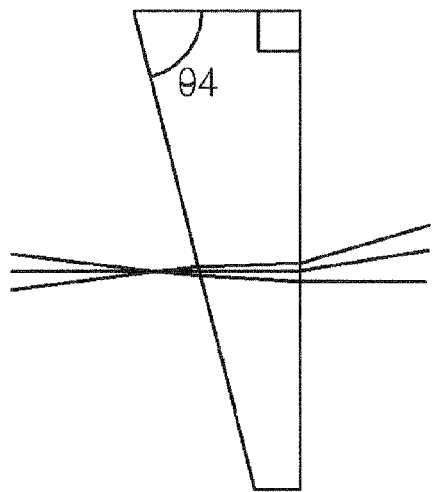

FIGS. 9a, 9b and 9c are schematic views illustrating configuration of a prism in a projector optical system according to the present disclosure.

The prism takes the shape of a wedge, and may take one of three configurations, that is, a configuration in which incident light and emitted light are refracted for downward illumination, as illustrated in FIG. 9a, and a configuration in which emitted light is refracted and downwardly illuminated as shown in FIG. 9b, and a configuration in which incident light is refracted for downward illumination, as depicted in FIG. 9c.

In the configuration of FIG. 9a, in order for the prism to refract the incident and emitted light and to downwardly illuminate the light, an incident surface and an emitted surface of the prism are inclined at predetermined angles (θ1, θ2), in the configuration of FIG. 9b, in order for the prism to refract the emitted light and to downwardly illuminate the light, an emitted surface of the prism is inclined at a predetermined angle (θ3), and in order for the prism to refract the incident light and to downwardly illuminate the light, an incident surface the prism is inclined at a predetermined angle (θ4). Furthermore, the prism of FIG. 9a is formed with two sides that are not perpendicular to the optical axis of the illumination unit.

To be more specific, the prism is formed with first and second sides each being not perpendicular to the optical axis of the FEL, and third and fourth sides connected to the first and second sides, where each of the third and fourth sides are connected to the first side at an acute angle, and each of the third and fourth sides are connected to the second side at an obtuse angle.

Figure 10:
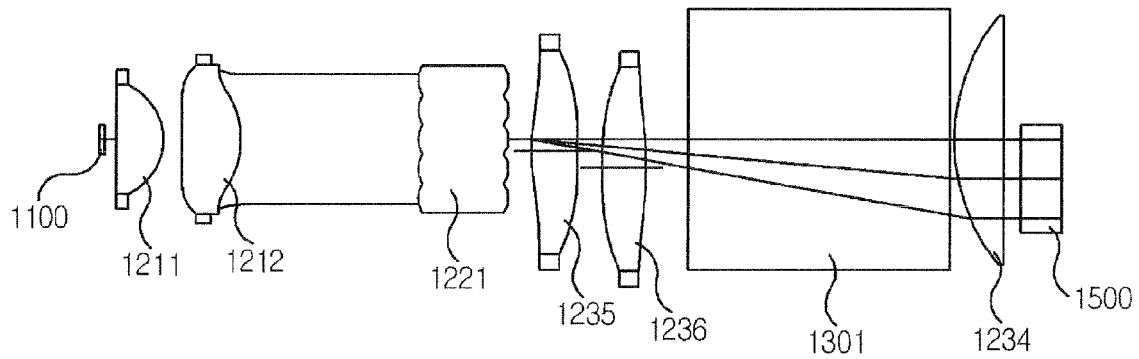
FIG. 10 is a schematic view illustrating configuration of an illumination unit for downward illumination in a projector optical system according to a second exemplary embodiment of the present disclosure.

FIG. 10 is a schematic view illustrating configuration of an illumination unit for downward illumination in a projector optical system according to a second exemplary embodiment of the present disclosure.

The illumination unit according to a second exemplary embodiment of the present disclosure is to construct an optical system for downwardly illuminating light to a display device by moving an optical axis of two illumination lenses.

Therefore, the illumination unit in the projector optical system according to the second exemplary embodiment of the present disclosure may include a light source (1100), collimation lenses (1211, 1212) advancing light emitted from the light source (1100) to a predetermined direction in parallel, an FEL (Fly Eye Lens, 1221) causing the light of the collimation lenses (1211, 1212) to be uniformly incident on a display device (1500), and first and second illumination lenses (1235, 1236), each having an optical axis different from that of the FEL (1221) and downwardly illuminating light from the FEL (1221) to a display device (1500).

That is, the illumination unit in the projector optical system according to the second exemplary embodiment of the present disclosure moves each optical axis of the first and second illumination lenses (1235, 1236) in a different manner from that of the FEL (1221) to allow the light from the FEL (1221) to be downwardly illuminated to the display device (1500). At this time, the optical axis of the first illumination lens (1235) is more downwardly positioned than that of the FEL (1221), the optical axis of the second illumination lens (1236) is more downwardly positioned than that of the first illumination lens (1235), the light from the FEL (1221) is downwardly illuminated at the first illumination lens (1235), and the light from the first illumination lens (1235) is downwardly illuminated at the second illumination lens (1236).

According to the present disclosure, two illumination lenses like the first and second illumination lenses (1235, 1236) may be applied to the projector optical system, or at least one illumination lens may be applied to the projector optical system.

Figure 11:
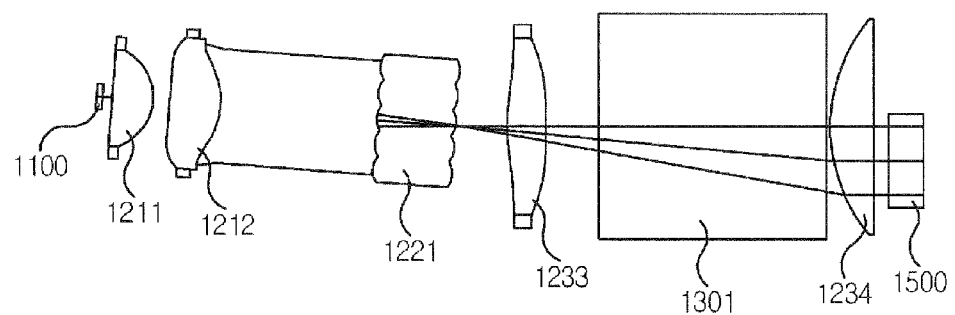
FIG. 11 is a schematic view illustrating configuration of an illumination unit for downward illumination in a projector optical system according to a third exemplary embodiment of the present disclosure.

FIG. 11 is a schematic view illustrating configuration of an illumination unit for downward illumination in a projector optical system according to a third exemplary embodiment of the present disclosure.

The illumination unit in the projector optical system according to the third exemplary embodiment of the present disclosure may include a light source (1100) of the illumination unit according to the first exemplary embodiment of the present disclosure and collimation lenses (1211, 1212), where a first optical axis of an FEL (1221) is tilted from the second optical axis of the illumination lens (1233) to illuminate light downwardly.

The illumination unit in the projector optical system according to the third exemplary embodiment of the present disclosure is such that the light emitted from the light source (1100) advances through the collimation lenses (1211, 1212) and the FEL (1221) to a direction of a first optical axis, advances to a direction of a second optical axis of the illumination lens (1233), and is downwardly illuminated to the display device (1500).

The illumination units according to the second and third exemplary embodiments of the present disclosure can perform the downward illumination using optical movement or tilting free from additional components.

Meanwhile, the illumination unit according to the second exemplary embodiment of the present disclosure includes the collimation lenses (1211, 1212) advancing light emitted from the light source (1100) to a predetermined direction in parallel, the FEL (Fly Eye Lens, 1221) causing the light of the collimation lenses (1211, 1212) to be uniformly incident on a display device (1500), and an illumination lenses (1233), an optical axis of which is tilted differently from that of the light source, the FEL (1221) and the collimation lenses (1211, 1212). The illumination lens (1233) is interposed between the FEL (1221) and a PBS (1301). An illumination lens (1234) may be interposed between the PBS (1301) and the display device (1500).

Figure 12:
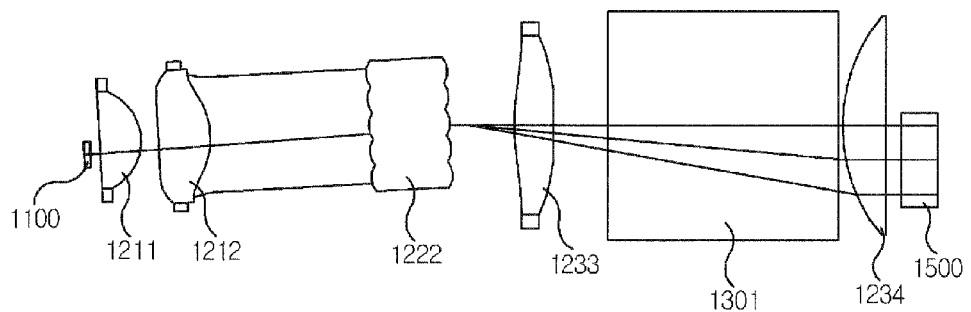
FIG. 12 is a schematic view illustrating configuration of an illumination unit for downward illumination in a projector optical system according to a fourth exemplary embodiment of the present disclosure.

FIG. 12 is a schematic view illustrating configuration of an illumination unit for downward illumination in a projector optical system according to a fourth exemplary embodiment of the present disclosure.

The illumination unit according to the fourth exemplary embodiment of the present disclosure includes a light source (1100), and collimation lenses (1211, 1212), each optical axis of which is tilted from an optical axis of an FEL (1222), where the FEL (1222) includes micro lenses formed at an incident surface and collecting the incident light on an emitting surface, and micro lenses formed at an emitting surface and downwardly advancing the collected light to an optical axis.

Figure 13:
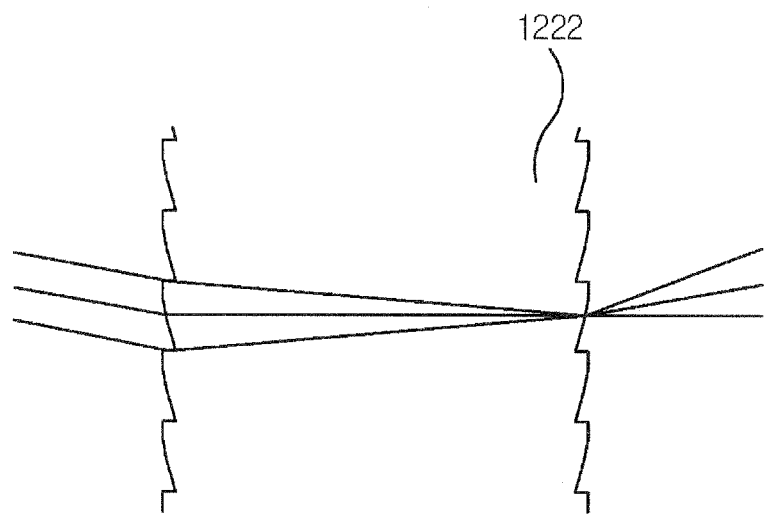
FIG. 13 is a partial cross-sectional view of an FEL (Fly Eye Lens) of the illumination unit according to the fourth exemplary embodiment of the present disclosure.

Therefore, the light through the collimation lenses (1211, 1212) is downwardly directed by the FEL (1222) and is illuminated to the display device (1500). At this time, the light source (1100) and the collimation lenses (1211, 1212) may be aligned on the same optical axis. Furthermore, the FEL (1222) is formed with a light incident surface and a light emitting surface in the shape of a saw-tooth at each cross-section, as shown in FIG. 13, and each cross-section of the incident surface and emitting surface becomes saw-toothed by the individual cross-section of the micro lenses, as depicted in FIG. 13.

Figure 14A:
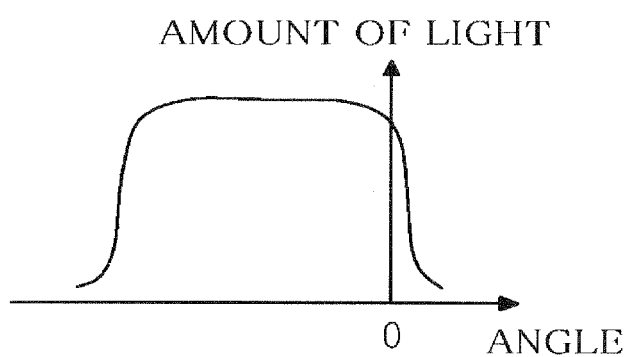
FIGS. 14a and 14b illustrate optical angle distribution views before and after light is transmitted through an FEL according to the fourth exemplary embodiment of the present disclosure.
Figure 14B:
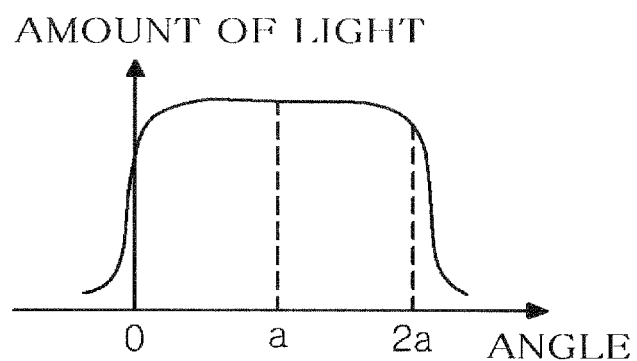
Figure 15:
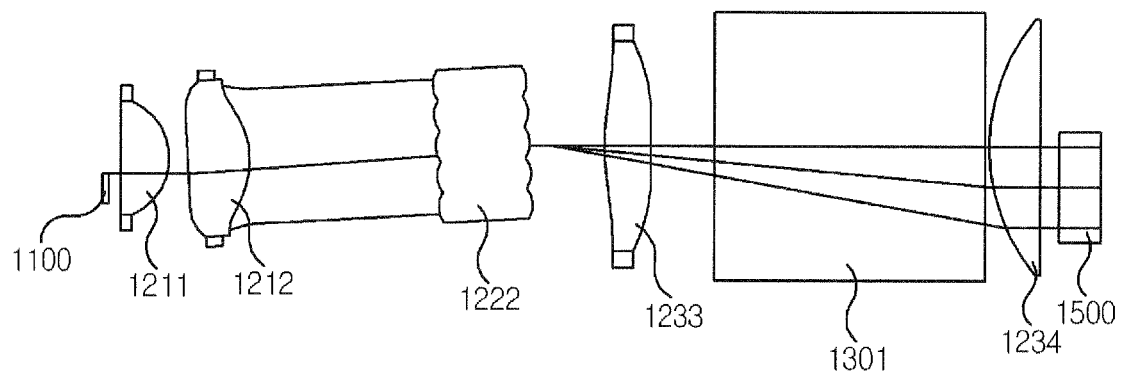
FIG. 15 is a schematic view illustrating another example of the illumination unit for downward illumination in a projector optical system according to a fourth exemplary embodiment of the present disclosure.

Still furthermore, as illustrated in FIG. 14a, the optical angle of light prior to being incident on the FEL (1222) is distributed to the left relative to the optical axis of the FEL (1222), because the optical axes of the light source (1100) and the collimation lenses (1211, 1212) are tilted. However, as shown in FIG. 14b, the angle of light that has passed the FEL (1222) is downwardly distributed to the right relative to the optical axis. In a case the center of the light source (1100) is downwardly positioned from the optical axes of the collimation lenses (1211, 1212), the light may be downwardly illuminated to the display device (1500).

Figure 16:
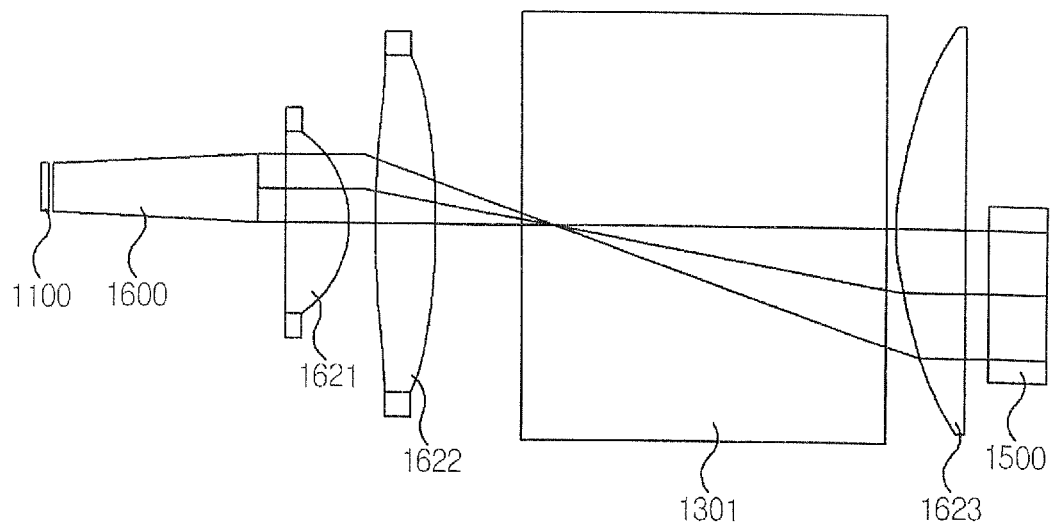
FIG. 16 is a schematic view illustrating configuration of an illumination unit for downward illumination in a projector optical system according to a fifth exemplary embodiment of the present disclosure.

FIG. 16 is a schematic view illustrating configuration of an illumination unit for downward illumination in a projector optical system according to a fifth exemplary embodiment of the present disclosure.

The illumination unit according to the fifth exemplary embodiment of the present disclosure downwardly illuminates the light using a light guide block (1600). The light guide block (1600) is interposed between the light source (1100) and illumination units (1621, 1622), where an optical axis of the light guide block (1600) is deviated from optical axes of the illumination units (1621, 1622). At this time, the light emitted from the light source (1100) is incident on an inlet of the light guide block (1600), and the light emitted from an outlet of the light guide block (1600) is downwardly illuminated to the display device (1500) through the illumination units (1621, 1622) and a PBS (1301), where the illumination units (1621, 1622) collect the light exited from the light guide block (1600) to the PBS (1301).

Figure 17:
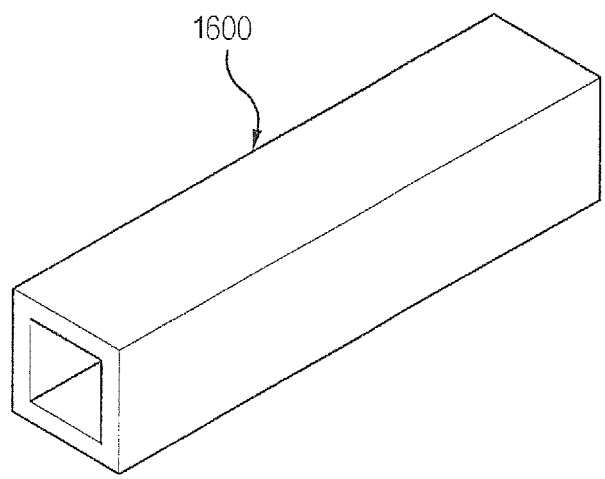
FIG. 17 is a schematic view illustrating configuration of a optical guide block of an illumination unit in a projector optical system according to a fifth exemplary embodiment of the present disclosure.

As shown in FIG. 17, the light guide block (1600) takes the shape of a square cylinder having a square through hole, and may be manufactured in four laminated mirrors or in glass or a transparent body. In case of manufacturing the light guide block (1600) in the glass or transparent body, all light is reflected from the light guide block to be guided because the refractive index thereof is greater than that of air. Furthermore, the light guide block (1600) makes the light in the same square shape as the shape of an active area of the display device (1500).

Figure 18:
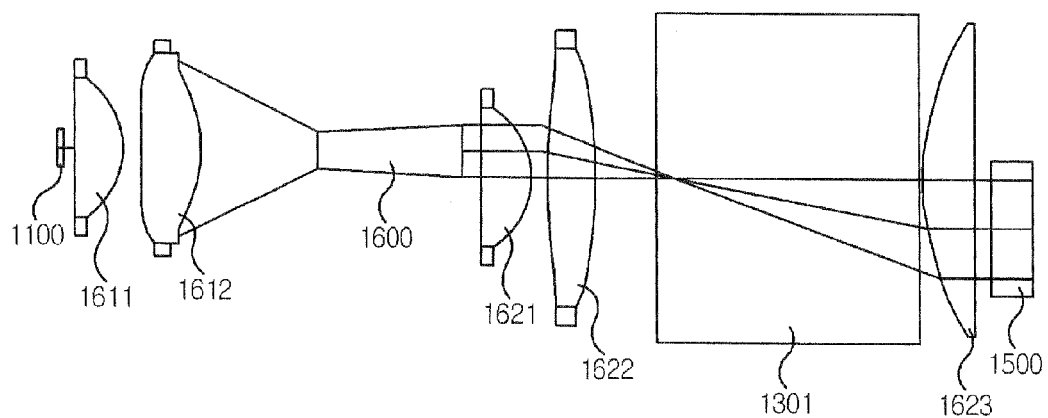
FIG. 18 is a schematic view illustrating configuration of a modification of an illumination unit for downward illumination in a projector optical system according to a fifth exemplary embodiment of the present disclosure.

FIG. 18 is a schematic view illustrating configuration of a modification of an illumination unit for downward illumination in a projector optical system according to a fifth exemplary embodiment of the present disclosure.

The modification of the illumination unit in FIG. 18 for downward illumination in a projector optical system according to a fifth exemplary embodiment of the present disclosure is such that first and second condenser lenses (1611, 1612) condensing the light emitted from the light source (1100) and the light guide block (1600) generating the same shape of light as that of the display device (1500) by receiving the condensed light from the first and second condenser lenses, are inserted the light source (1100) and the illumination units (1621, 1622), where an optical axis of the light guide block (1600) and the axes of the illumination units (1621, 1622) are aligned in deviating manner.

The illumination unit thus configured is such that light emitted from the light source (110) via the first and second condenser lenses (1611, 1612) is condensed to the light guide block (1600), and light guided by the light guide block (1600) is downwardly illuminated to the display device (1500) from the illumination units (1621, 1622) through the PBS (1301). A illumination lens (1623) may be interposed between the PBS (1301) and the display device (1500).

The above-mentioned projector optical system according to the present disclosure may, however, be embodied in many different forms and should not be construed as limited to the embodiments set forth herein. Thus, it is intended that embodiments of the present disclosure may cover the modifications and variations of this disclosure provided they come within the scope of the appended claims and their equivalents.

While particular features or aspects may have been disclosed with respect to several embodiments, such features or aspects may be selectively combined with one or more other features and/or aspects of other embodiments as may be desired.

What is claimed is:

1. A projector optical system, the system comprising:
an illumination unit including illumination lenses illuminating light downwards;
a display device receiving light illuminated from the plurality of illumination lenses to enable the display device to realize an image;
a plurality of projection lenses downwardly projecting light emitted from the display device to a screen; and
a first field lens arranged between the illumination unit and the display device for changing a first optical angle of the light illuminated from the plurality of illumination lenses and emitting the light to the display device, and a second field lens arranged between the display device and the plurality of projection lenses for changing a second optical angle by receiving an image light of the display device and emitting the image light to the plurality of projection lenses;
wherein the plurality of illumination lenses and the plurality of projection lenses are on a same optical axis, and
wherein the display device is a reflective display device.

2. The projector optical system of claim 1, wherein a center of the display device is positioned further down than the optical axis of the plurality of projection lenses, and wherein the second field lens receives the image light of the display device and emits the image light to the plurality of projection lenses by upwardly changing an optical angle.

3. The projector optical system of claim 1, wherein a center of the display device is positioned further down than the optical axis of the plurality of illumination lenses, and wherein the first field lens receives light illuminated from the plurality of illumination lenses and emits the light to the display device by downwardly changing an optical angle.

4. The projector optical system of claim 1, wherein the display device is a DMD (Digital Microminor Device).

5. The projector optical system of claim 1, wherein at least one lens of the plurality of illumination lenses has an optical axis further down than optical axes of the first and second field lenses.

6. The projector optical system of claim 1, wherein the illumination unit includes an optical guide block arranged between a light source and the plurality of illumination lenses for receiving light emitted from the light source to generate an optical shape that is the same as a shape of the display device, wherein the plurality of illumination lenses is formed with an optical axis deviated from an optical axis of the optical guide block.

7. The projector optical system of claim 6, further comprising first and second condenser lenses condensing the light emitted from the light source to the optical guide block that are interposed between the light source and the optical guide block.

8. A projector optical system, comprising:
an illumination unit including a plurality of illumination lenses illuminating light downwards;

a display device receiving light illuminated from the plurality of illumination lenses to enable the display device to realize an image;

a plurality of projection lenses downwardly projecting light emitted from the display device to a screen; and a first field lens arranged between the illumination unit and the display device for changing a first optical angle of the light illuminated from the plurality of illumination lenses and emitting the light to the display device, and a second field lens arranged between the display device and the plurality of projection lenses for changing a second optical angle by receiving an image light of the display device and emitting the image light to the plurality of projection lenses;

wherein a plurality of optical axes of the plurality of illumination lenses is parallel to a plurality of optical axes of the plurality of projection lenses, and wherein the display device is a reflective display device.

9. The projector optical system of claim 8, wherein the display device is a DMD (Digital Micromirror Device).

10. The projector optical system of claim 8, wherein at least one lens of the plurality of illumination lenses has an optical axis further down than optical axes of the first and second field lenses.

11. The projector optical system of claim 8, wherein the illumination unit includes an optical guide block arranged between a light source and the plurality of illumination lenses for receiving light emitted from the light source to generate an optical shape that is the same as a shape of the display device, wherein the plurality of illumination lenses is formed with an optical axis deviated from an optical axis of the optical guide block.

12. A projector optical system, comprising:
an illumination unit including a plurality of illumination lenses illuminating light downwards;
a display device receiving light illuminated from the plurality of illumination lenses to enable the display device to realize an image;
a plurality of projection lenses downwardly projecting light emitted from the display device to a screen; and
a first field lens arranged between the illumination unit and the display device for changing a first optical angle of the light illuminated from the plurality of illumination lenses and emitting the light to the display device, and a second field lens arranged between the display device and the plurality of projection lenses for changing a second optical angle by receiving an image light of the display device and emitting the image light to the plurality of projection lenses;
wherein the illumination unit further includes a collimation lens arranged between a light source and the plurality of illumination lenses for advancing in parallel light emitted from between a light source and the plurality of illumination lenses in a predetermined direction, and an optical component that uniformly emits light from the collimation lens to the display device, and wherein at least one lens of the illumination unit is tilted from an optical axis of the light source, the collimation lens and the optical component, and
wherein the display device is a reflective display device.

13. The projector optical system of claim 12, wherein a center of the light source is downwardly positioned from the optical axis of the collimation lens.

14. The projector optical system of claim 12, wherein the light source, the collimation lens, and the optical components are on a same optical axis.

15. The projector optical system of claim 12, further comprising a PBS (Polarizing Beam Splitter) that transmits the light from the illumination unit to the display device, wherein the illumination lenses include first and second illumination lenses, and wherein the first illumination lens is interposed between the optical component and the PBS, and the second illumination lens is interposed between the PBS and the display device.

16. The projector optical system of claim 12, wherein the display device is a DMD (Digital Micromirror Device).

17. A projector optical system, comprising:
an illumination unit including a plurality of illumination lenses illuminating light downwards;
a TIR (Total Information Reflector) reflecting light from the illumination unit and transmitting an image light;
a display device receiving the light from the illumination unit reflected from the TIR to enable the display device to realize the image light;
a plurality of projection lenses downwardly projecting light emitted from the display device to a screen; and
a first field lens arranged between the illumination unit and the display device for changing a first optical angle of the light illuminated from the plurality of illumination lenses and emitting the light to the display device, and a second field lens arranged between the display device and the plurality of projection lenses for changing a second optical angle by receiving an image light of the display device and emitting the image light to the plurality of projection lenses;
wherein the plurality of illumination lenses and the plurality of projection lenses are on a same optical axis, and
wherein the display device is a reflective display device.

18. The projector optical system of claim 17, wherein the second field lens is positioned between the TIR, and the display device.

19. The projector optical system of claim 17, wherein the display device is a DMD (Digital Micromirror Device).

* * * * *